(12) United States Patent
Katou et al.

(10) Patent No.: US 6,422,971 B1
(45) Date of Patent: Jul. 23, 2002

(54) PLANETARY CARRIER

(75) Inventors: Hiroshi Katou; Masahiro Hayabuchi; Masaaki Nishida; Satoru Kasuya; Yukio Hiramoto, all of Anjo (JP)

(73) Assignee: Aisin AW Co., Ltd., Anjo (JP)

( * ) Notice: Subject to any disclaimer, the term of this patent is extended or adjusted under 35 U.S.C. 154(b) by 38 days.

(21) Appl. No.: 09/679,288

(22) Filed: Oct. 6, 2000

(30) Foreign Application Priority Data

Oct. 8, 1999 (JP) ............................................ 11-288824

(51) Int. Cl.[7] ................................................ F16H 57/08
(52) U.S. Cl. ........................ 475/331; 475/340; 475/338
(58) Field of Search ................................ 475/331, 252, 475/323, 340, 338

(56) References Cited

U.S. PATENT DOCUMENTS

| 4,793,214 A | * | 12/1988 | Nunberger et al. | ......... 29/893.1 |
| 5,509,865 A | * | 4/1996 | Hall | ............................ 475/269 |
| 5,928,105 A | * | 7/1999 | Taha et al. | .................. 475/331 |

FOREIGN PATENT DOCUMENTS

| JP | 05248499 A | * | 9/1993 |
| JP | 06081905 | * | 3/1994 |
| JP | 2852819 | | 11/1998 |

* cited by examiner

*Primary Examiner*—Rodney H. Bonck
*Assistant Examiner*—David D. Le
(74) *Attorney, Agent, or Firm*—Oliff & Berridge, PLC

(57) ABSTRACT

A planetary carrier supports a plurality of short pinions and long pinions and includes a first supporting wall supporting one ends of the short pinions and the long pinions, second supporting walls supporting the other ends of the short pinions, third supporting walls supporting the other ends of the long pinions, first connecting walls connecting the first supporting wall and the second supporting walls, pairs of second connecting walls facing each other, arranged on both sides of each long pinion in the rotational direction of the carrier, and connecting the second supporting walls and the third supporting walls, and third connecting walls connecting each pair of the second connecting walls to each other on at least one of the radial inner side and the radial outer side of each long pinion.

7 Claims, 3 Drawing Sheets

PLANETARY CARRIER

BACKGROUND OF THE INVENTION

1. Field of the Invention

The invention relates to improving the rigidity of a planetary carrier of a planetary gear set having short pinions and long pinions.

2. Description of the Related Art

In a planetary gear set of an automatic transmission, generally, each gear is a helical gear for continually meshing the gears smoothly. When helical gears are used, a carrier supporting the pinions receives torsional moment based on a reaction force that occurs when the gears mesh. Therefore, if the rigidity of the planetary carrier is low, the carrier is deformed, and then the gears are not meshed appropriately. As a result, problems, such as deterioration of the durability of the gears and gear noise, occur. When a simple planetary gear is provided, a supporting span of the carrier for supporting the pinion gears is short. Therefore, it is comparatively easy to maintain the rigidity of the planetary carrier against the torsional moment. When a ravegneaux type planetary gear is provided, the axial length of the pinion is long. If the number of pinions is increased, a space for arranging bridge members axially connecting both sides of the carrier is particularly limited. Therefore, it is difficult to maintain enough cross section for maintaining rigidity against a torsional moment.

Japanese Patent No. 2852819 describes a planetary carrier formed by welding a first supporting member having a cup shape on a second supporting member having a cup shape and having a flange portion on the periphery thereof. The base wall of the first supporting member supports one end of both type of pinions, short and long, and the base wall of the second supporting member supports the other end of the short pinions. Supporting portions for the other end of the long pinions are formed by partly cutting down the surrounding wall of the second supporting member to the radial inner side, and the surrounding wall of the first supporting member is partly cut for meshing the long pinions with the ring gear.

The ravegneaux planetary carrier described above is formed by connecting both of the cup shaped supporting members, then the carrier is formed as a box shape. Therefore, the rigidity of the carrier is maintained. However, the supporting portions for the long pinions are formed by cutting down the surrounding wall, therefore, the supporting portions are supported by the flange portion at one side. Therefore, it is estimated that the rigidity for supporting the long pinions is low, and then this carrier is not suitable for a larger planetary gear set.

Further, the structure, in which the surrounding wall is partly cut for meshing the long pinions with the ring gear, is usable in case the pinion gear diameter is small. However, when the pinion gear diameter is enlarged for maintaining high capacity and high durability of the planetary gear set corresponding to high power and high speed rotation, the cut portion of the surrounding wall of the first supporting member must be large, therefore, it is difficult to maintain the rigidity of the carrier. When the diameter of the carrier is enlarged, the rigidity is maintained. However, when the planetary gear set is enlarged it is no longer lightweight and compact.

SUMMARY OF THE INVENTION

In view of the above problems associated with the prior art, an aspect of the invention is a planetary carrier which improves the durability of a planetary gear irrespective of the diameter of the pinions, supporting short pinions and long pinions.

According to an exemplary embodiment of the invention, a planetary carrier supporting plural short pinions and plural long pinions includes a first supporting wall supporting one ends of the short pinions and the long pinions, second supporting walls supporting the other ends of the short pinions, third supporting walls supporting the other ends of the long pinions, first connecting walls connecting the first supporting wall and the second supporting walls, pairs of second connecting walls facing each other, arranged on both sides of the long pinions in the rotational direction of the carrier, and connecting the second supporting walls and the third supporting walls, and third connecting walls connecting the pairs of the second connecting walls to each other on at least one of the radial inner side and the radial outer side of the long pinion.

The planetary carrier has fourth connecting walls, which extend from the second supporting walls to the third supporting walls, connecting with the third connecting walls, and forming a continuous annular wall with the third connecting walls. The planetary carrier has the annular wall formed from the third connecting walls and the fourth connecting walls, and forming a periphery wall of the planetary carrier. A spline is formed on the surface of the periphery wall.

The planetary carrier has fifth connecting walls, which connect the radial inner ends of the second supporting walls and the second connecting walls to each other.

The first connecting walls fill the spaces surrounding the peripheries of the short pinions, the peripheries of the long pinions and the peripheries of the first connecting walls which are closest to the periphery of the planetary carrier. The first supporting wall and the third supporting walls have support portions supported by other rotational members, respectively.

According to an exemplary embodiment of the invention, each pair of second connecting walls and each third connecting wall connects each second supporting wall to each third supporting wall, and forms a box structure surrounding the long pinion. Therefore, the rigidity of the carrier from each second supporting wall to each third supporting wall is improved. Generally, it is difficult to maintain the rigidity of each second supporting wall because cut down portions are formed for passing through the long pinions between the adjoining short pinions. In the invention, however, the second supporting walls are connected to the third supporting walls with the second and third connecting walls arranged along with the cut down portions so that the adjoining second supporting walls are connected to each other with the box structures formed from the second and third connecting walls and the third supporting walls. As a result, the rigidity of the second supporting wall is improved. Thus, the first connecting walls, acting as bridge portions connecting the first supporting wall and the second supporting walls to each other, can be shortened to substantially equal the axial length of the short pinion by improving the rigidity between the second supporting walls and the third supporting walls. As a result, the rigidity of the carrier as a whole is improved.

The annular wall is formed by connecting the third connecting wall and the fourth connecting wall. Therefore, the rigidity from the second supporting wall to the third supporting wall is further improved, and the rigidity of the carrier as a whole is also improved. Further, the portion of the carrier on the radial inner side of the fourth connecting wall that does not support the long pinion is formed as a space. Therefore, the carrier is lightened and the carrier rigidity is improved.

The spline is formed on the annular wall, which is continuous around the periphery of the carrier for improving the rigidity of the carrier, for using the annular wall as a hub of a clutch or a brake as a common member. Therefore, the transmission may be reduced in weight and made compact.

The second connecting wall, which connects the second supporting wall supporting the other end of the short pinion and the third supporting wall supporting the other end of the long pinion, is connected with the fifth connecting wall at the radial inner side of the carrier. Therefore, the rigidity of the carrier is further improved.

Each first connecting wall fills as much of the limited space between each short pinion and each long pinion as possible. Therefore, the rigidity of each first connecting wall, which acts a bridge member connecting the first supporting wall to the second supporting walls, is improved and the rigidity of the carrier as a whole is improved. In this case, even if the diameters of the pinions are large, the cross section of each first connecting wall can be maintained by using the space between the pinions, which are adjacent to each other. Therefore, the rigidity of the carrier can be improved without enlarging the diameter of the carrier.

Further, the first supporting wall and the third supporting walls have supported portions. Therefore, the rigidity of both supporting walls is improved, and the rigidity of the carrier is improved.

BRIEF DESCRIPTION OF THE DRAWINGS

The invention will be described in conjunction with the following drawings in which like features are designated with like reference characters, and wherein.

DETAILED DESCRIPTION OF EXEMPLARY EMBODIMENTS

Figure 1:
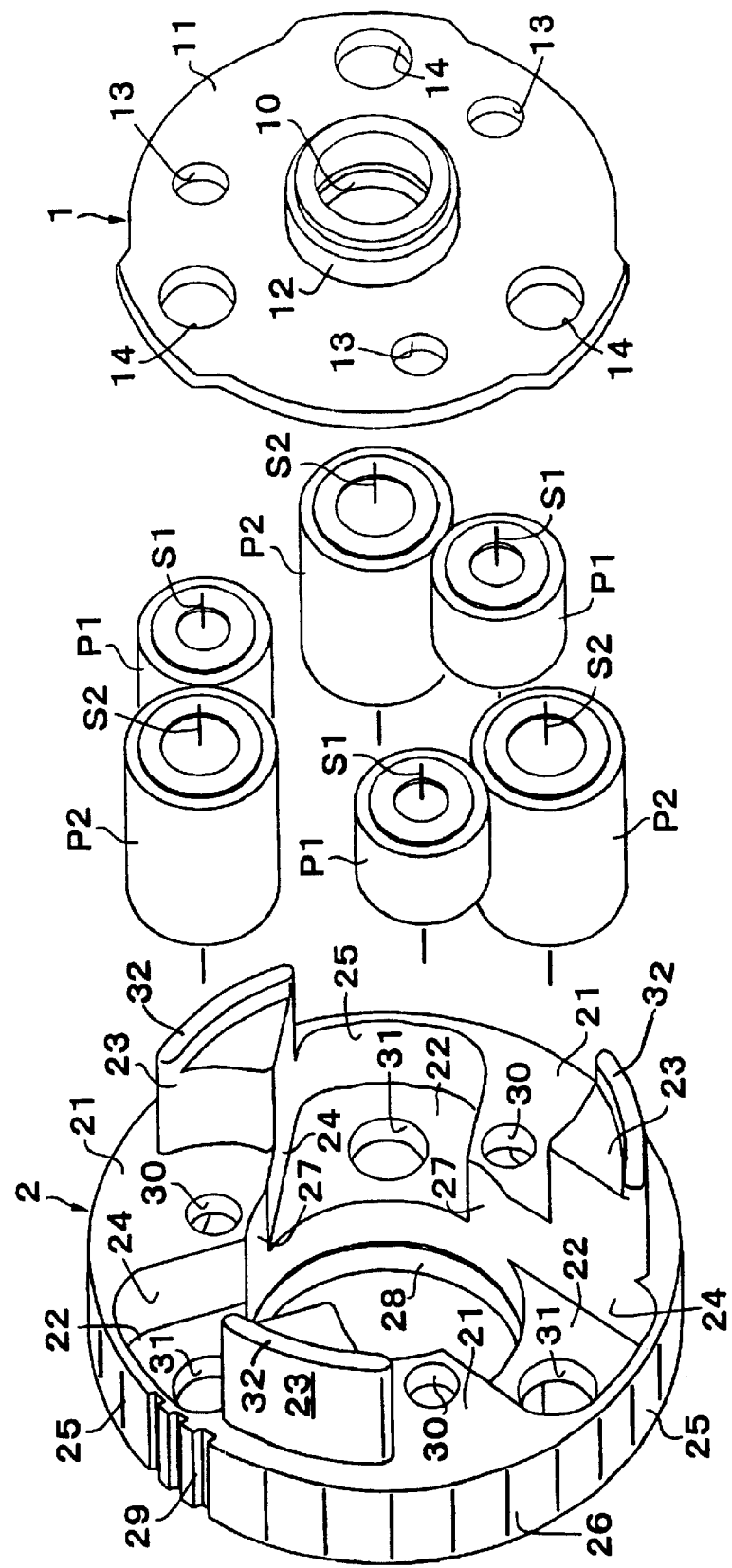
FIG. 1 is an exploded assembly diagram of a planetary carrier according to an exemplary embodiment of the invention.
Figure 2:
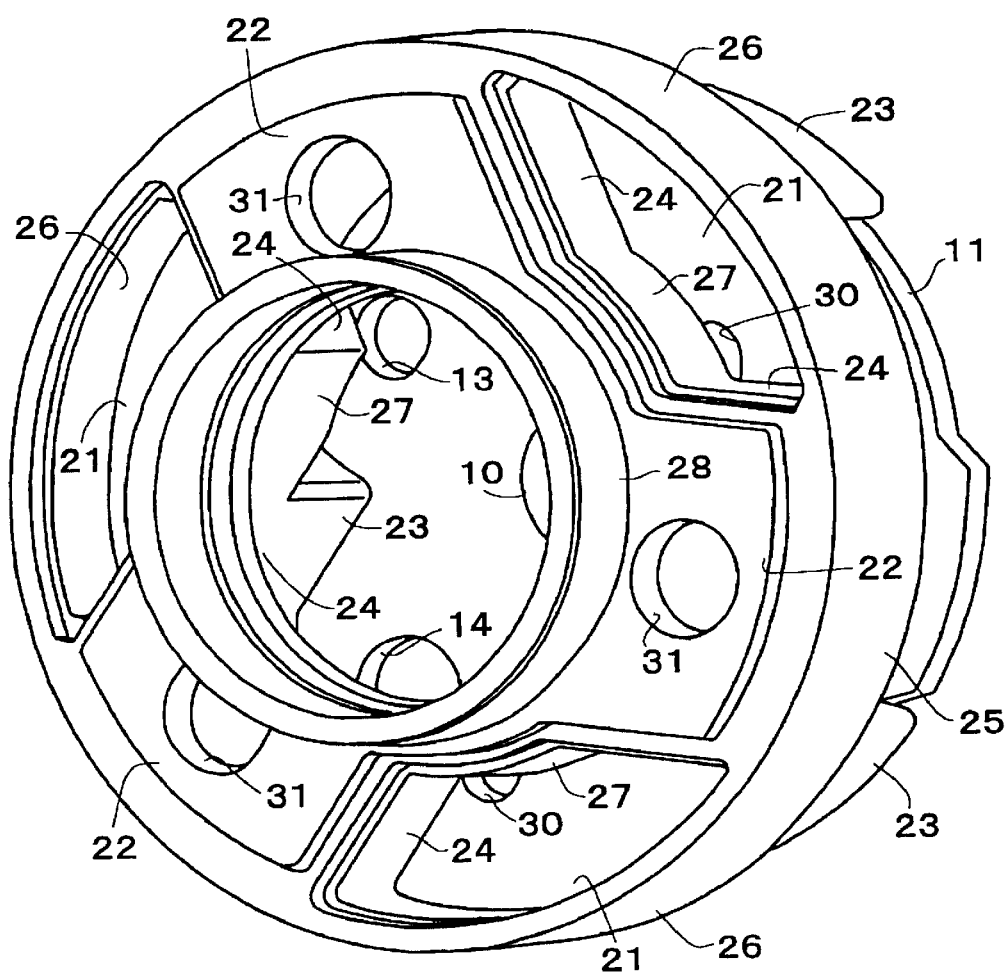
FIG. 2 is a perspective view of the rear side of the planetary carrier of FIG. 1.

The invention will become more apparent from a detailed description of exemplary embodiments with reference to the accompanying drawings. FIG. 1 is an exploded assembly diagram of a planetary carrier 1, 2 according to an exemplary embodiment of the invention, and FIG. 2 is a perspective view of the rear side of the planetary carrier 1, 2 shown in FIG. 1. As shown in FIG. 1, three short pinions P1 and three long pinions P2 are arranged. Helical teeth are formed on the peripheries of both pinions P1 and P2. However, the illustration of the helical teeth is omitted. Further, illustrations of a small diameter sun gear meshing with the short pinions P1 and a large diameter sun gear and a ring gear meshing with the long pinions P2 are omitted.

The planetary carrier 1, 2 comprises a first supporting wall 11 including a radial wall supporting one ends of the short pinions P1 and the long pinions P2, second supporting walls 21 including radial walls supporting the other ends of the short pinions P1, third supporting walls 22 including radial walls supporting the other ends of the long pinions P2, first connecting walls 23 connecting the first supporting wall 11 and the second supporting walls 21 in the axial direction, pairs of second connecting walls 24 facing each other, arranged on both sides of the long pinions P2 in the rotational direction of the carrier 1, 2, and connecting the second supporting walls 21 and the third supporting walls 22 in the axial direction, and third connecting walls 25 connecting the pairs of the second connecting walls 24 to each other on the radial outer side of the long pinions P2.

The planetary carrier includes fourth connecting walls 26, which extend in the direction from the second supporting walls 21 to the third supporting walls 22, connect with the third connecting walls 25 at both ends so as to form a continuous annular wall with the third connecting walls 25. That is, the third connecting walls 25 and the fourth connecting walls 26 are alternately connected to each other on the periphery of the carrier 1, 2 for forming the annular wall.

Thus, the annular connecting wall formed from the third connecting walls 25 and the fourth connecting walls 26 forms the continuous periphery wall of the carrier 1, 2. In this embodiment, the spline 29 having, for example, about 50 teeth for supporting frictional members of a multiple disc brake or a multiple disc clutch is formed on the surface of the periphery wall for using the periphery wall as a brake fixing the carrier 1, 2 to a transmission case or a hub of a clutch connecting the carrier 1, 2 to another shift element.

The planetary carrier includes a fifth connecting walls 27, which orthogonally connect to the radial inner ends of the second supporting walls 21 and the radial inner ends of the second connecting walls 24.

The first connecting walls 23 fill the spaces surrounding the periphery of the short pinions P1, the periphery of the long pinions P2 and the faces of the first supporting wall 11 which are the closest to the periphery of the planetary carrier 1, 2 for maintaining enough cross sectional rigidity. Specifically, each of the first connecting walls 23 has three axially extending faces. The first face is an extension of the face of the second connecting wall 24, the second face is a partial annular face, which is a concave face facing along the periphery of the short pinion P1, and the third face is a partial annular face, which is a convex face parallel to the periphery of the carrier 1, 2, and then each first connecting wall 23 is shaped as a triangular pillar.

The first supporting wall 11 and the third supporting walls 22 positioned at ends of the planetary carrier 1, 2 have supported portions 12 and 28, each being supported by another rotational member. Specifically, the supported portions 12 and 28 are boss portions extending in the axial direction of the carrier 1, 2 from both of the supporting walls 11 and 22.

Further detail will be specifically explained. In the exemplary embodiment, the planetary carrier 1, 2 is formed from a main body 2 and a cover 1. The cover 1 includes the first supporting wall 11, and the main body 2 includes the remaining walls.

The first supporting wall 11 of the cover 1 has a disc shape, a center hole 10 and the boss portion 12, which is the supported portion supported by the rotational member, such as an input shaft of an transmission, having the same diameter as the center hole 10 extending axially from one side of the cover 1. Three small diameter holes 13 for supporting pinion shafts S1, of which only the center lines are shown in FIG. 1, of the short pinions P1 and three large diameter holes 14 for supporting pinion shafts S2, of which only center lines are shown in FIG. 1, of the long pinions P2 are formed on the cover 1. The diameters of three periphery portions of the supporting wall 11 positioned on the radial outer side of the large diameter holes 14 against the center hole 10 are larger than the other periphery portions. The enlarged diameter portions and the other periphery portions position the cover 1 against the main body 2.

The main body 2 including the remaining walls is formed from an annular member, the first connecting walls 23 axially extending to one side from the radial outer portion of the annular member, and the boss portion 28, as the supported portion supported by another rotational member, such as a shaft portion of a large diameter sun gear, extending from the third supporting wall 22 of the annular member to the other side of the first connecting walls 23. The annular member is formed from sectoral boxes and U shaped boxes. Each sectoral box includes the second supporting wall 21 as a bottom wall and is surrounded by the fourth connecting wall 26 at the radial outer side, the fifth connecting wall 27 at the radial inner side and the pair of second connecting walls 24 at both perimeter sides. Each U shaped box includes the third supporting wall 22 as a bottom wall and is surrounded by the third connecting wall 25 at the radial outer side and the pair of second connecting walls 24 at both perimeter sides. The sectoral boxes and the U shaped boxes are aligned alternately in the circumferential direction and have the pair of second connecting walls 24 in common. The opening directions of the sectoral boxes and the U shaped boxes are opposite. Each of the first connecting walls 23 axially individually extends from the second supporting walls 21 as the bottom walls of the sectoral boxes. Arcuate flanges 32 axially extend from the ends of the first connecting walls 23 at the radial outer portions. These flanges 32 position the cover 1 in the radial direction. Each of the three small diameter holes 30 for supporting the pinion shafts S1 of the short pinions P1 is individually formed approximately at the center of the bottom walls 21 of the sectoral boxes. Each of the three large diameter holes 31 for supporting the pinion shafts S2 of the long pinions P2 is individually formed approximately at the center of the bottom walls 22 of the U shaped boxes.

The main body 2 and the cover 1 thus form the carrier 1, 2 shown in FIG. 2 wherein the end faces of the first connecting walls 23 of the main body 2 are contacted with the face of the cover 1 and fixed together with bolts or welded together, and the walls described above are connected.

Figure 3:
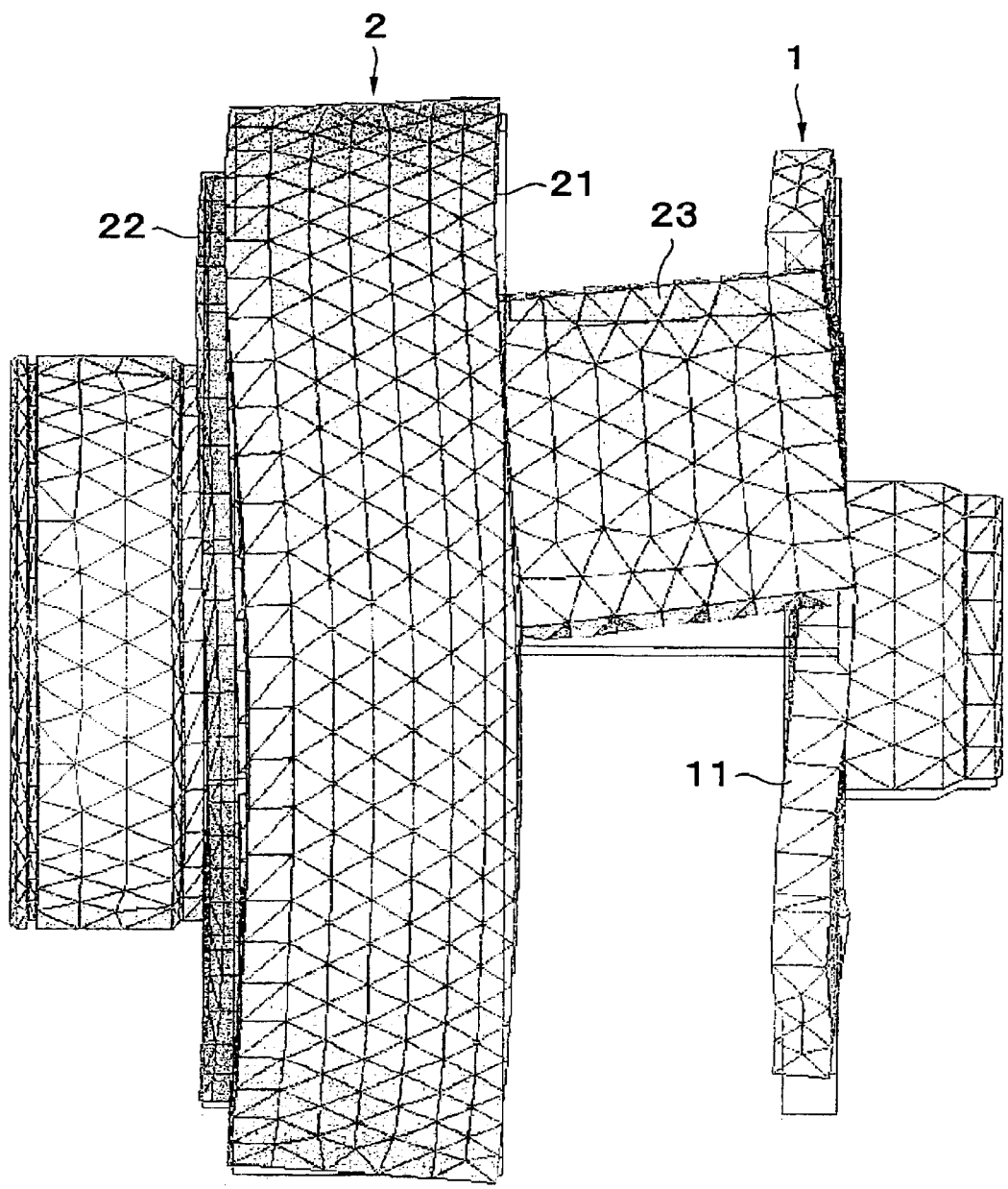
FIG. 3 is an analysis diagram illustrating torsional fluctuation behavior of an exemplary embodiment of the planetary carrier with a model.

FIG. 3 shows a transformation of the planetary carrier with a simulated model magnified 100 times when a clockwise torsional force is applied to the main body 2 and the cover 1. In the model shown in FIG. 3, the first connecting wall 23 is not deformed, but is displaced in the torsional direction against the center axis of the carrier 1, 2. The force causing the displacement of the first connecting walls 23 is transmitted to the first supporting wall 11 and the second supporting walls 21, which are arranged at both ends of the first connecting wall 23, and then, an undulating deformation in the circumferential direction of the carrier 1, 2 occurs in the cover 1 and the main body 2. This is a result of the improved rigidity of the first connecting walls 23. Therefore, when the first connecting walls 23 have a high rigidity, if the rigidity of at least one supporting wall connected to the first connecting walls 23 is increased, the undulating deformation occurring in both supporting walls 11 and 21 is decreased. In this embodiment, the undulating deformation is decreased by improving the rigidity of the second supporting walls 21. The rigidity of the second supporting walls 21 is improved by cooperation with the third supporting walls 22, that is, by forming the main body 2 as a box structure, then, the declination displacement of the first connecting walls 23 is decreased. As a result, the undulating deformation of the cover 1, which is difficult to maintain rigid, is decreased. Incidentally, it has been found that a change of the thickness of the cover 1 has little effect on the deformation. This means, paradoxically, the thickness of the cover 1 can be reduced by improving the rigidity of the main body 2.

In conventional planetary carriers, it is difficult to maintain the rigidity because an accommodating space for each long pinion has to be formed. In the planetary carrier structure of the exemplary embodiment, however, the long pinion accommodating space of the second supporting wall 21 is strengthened by connecting it to the third supporting wall 22 with the continuous second and third connecting walls 24 and 25. Further, the accommodating space is strengthened with the fourth connecting walls 26 and the fifth connecting walls 27 at the radial outer portion and the radial inner portion, respectively. That is, the second supporting walls 21 are strengthened by the box structure. Therefore, the second supporting walls 21 have high rigidity irrespective of the formation of each long pinion accommodating space.

The third supporting walls 22 are formed by extending only a necessary portion for supporting the long pinions P2 in the radial direction. However, because the third supporting walls 22 and the box structures strengthening the second supporting walls 21 are alternately connected, the third supporting walls 22 have high rigidity.

The rigidity of the second and third supporting walls 21 and 22 are improved to equal the rigidity of a monolithic carrier. As a result, the first connecting walls 23 as the bridge portions connecting the first supporting wall 11 and the second supporting walls 21 to each other can be shortened to substantially equal the axial length of the short pinion P1. The declination displacement of the first connecting walls 23 caused by the torsional force is decreased because the rigidity of the first connecting walls 23 is maintained by providing enough cross section and the first supporting walls 23 span is shortened as described above. As a result, the deformation of the first supporting wall 11 is also decreased. Thus, the pinion carrier having high rigidity is achieved.

As described above, the embodiment is described with both pinions P1 and P2 meshing with the sun gear. However, when the long pinions P2 mesh with the ring gear, the pair of second connecting walls 24 are connected to each other with the third connecting wall 25 at the radial inner side of the long pinion P2.

While this invention has been described in conjunction with the exemplary embodiments outlined above, it is evident that many alternatives, modifications and variations will be apparent to those skilled in the art. Accordingly, the exemplary embodiments of the invention, as set forth above, are intended to be illustrative, not limiting. Various changes may be made without departing from the spirit and scope of the invention.

What is claimed is:

1. A planetary carrier supporting plural short pinions and plural long pinions, comprising:

a first supporting wall supporting one ends of the short pinions and the long pinions;

second supporting walls supporting the other ends of the short pinions;

third supporting walls supporting the other ends of the long pinions;

first connecting walls connecting the first supporting wall and the second supporting walls;

pairs of second connecting walls facing each other, arranged on both sides of each long pinion in a rotational direction of the carrier, and connecting the second supporting walls and the third supporting walls; and third connecting walls connecting the pairs of the second connecting walls to each other on at least one of a radial inner side and a radial outer side of the long pinions and connecting the third supporting walls.

2. The planetary carrier according to claim 1, further comprising fourth connecting walls, which each extend in a direction from the second supporting walls to the third supporting walls, connecting with the third connecting walls and forming a continuous annular wall with the third connecting walls.

3. The planetary carrier according to claim 2, wherein the annular wall formed from the third connecting walls and the fourth connecting walls forms a periphery wall of the planetary carrier, and a spline is formed on the surface of the periphery wall.

4. The planetary carrier according to claim 2, further comprising fifth connecting walls, which each connect to the inner ends of the second supporting walls and connect the pairs of second connecting walls to each other.

5. The planetary carrier according to claim 3, further comprising fifth connecting walls, which each connect to the inner ends of the second supporting walls and connect the pairs of second connecting walls each other.

6. The planetary carrier according to claim 1 wherein the first connecting walls fill spaces surrounding the peripheries of the short pinions, the peripheries of the long pinions, and the peripheries of the first supporting wall which are the closest to the periphery of the planetary carrier.

7. The planetary carrier according to claim 1, wherein each of the first supporting wall and the third supporting walls have support portions being supported by other rotational members, respectively.

* * * * *